United States Patent
Young et al.

(10) Patent No.: US 12,442,339 B2
(45) Date of Patent: Oct. 14, 2025

(54) ELECTRIC DRIVE SYSTEM FOR A VEHICLE

(71) Applicants: Transportation IP Holdings, LLC, Norwalk, CT (US); Komatsu America Corp., Chicago, IL (US); Cummins Inc., Columbus, IN (US)

(72) Inventors: Henry Todd Young, Erie, PA (US); Rekha Doddarangaiah Prasad, Warrendale, PA (US); David John Scott, Washington, IL (US); Timothy Robert Heller, Germantown Hills, IL (US); Venkat Jayaraman, Columbus, IN (US)

(73) Assignees: Transportation IP Holdings, LLC; Komatsu America Corp.; Cummins Inc.

( * ) Notice: Subject to any disclaimer, the term of this patent is extended or adjusted under 35 U.S.C. 154(b) by 555 days.

(21) Appl. No.: 17/876,070

(22) Filed: Jul. 28, 2022

(65) Prior Publication Data
US 2023/0032197 A1     Feb. 2, 2023

Related U.S. Application Data

(60) Provisional application No. 63/228,418, filed on Aug. 2, 2021.

(51) Int. Cl.
*F02D 29/02*     (2006.01)

(52) U.S. Cl.
CPC ........ *F02D 29/02* (2013.01); *F02D 2200/101* (2013.01); *F02D 2200/701* (2013.01); *F02D 2200/702* (2013.01)

(58) Field of Classification Search
CPC ............... F02D 29/02; F02D 2200/101; F02D 2200/701; F02D 2200/702; F02D 31/001
See application file for complete search history.

(56) References Cited

U.S. PATENT DOCUMENTS

| | | | |
|---|---|---|---|
| 7,206,689 B1 * | 4/2007 | Johnson | F02D 41/2451 701/55 |
| 2009/0118912 A1 * | 5/2009 | Hugenroth | A01D 41/1274 701/50 |
| 2010/0261576 A1 * | 10/2010 | Ishido | B60W 10/06 477/43 |
| 2020/0025124 A1 * | 1/2020 | Mutschler | F02D 41/0205 |

(Continued)

FOREIGN PATENT DOCUMENTS

| | | | | |
|---|---|---|---|---|
| AU | 2011271016 B2 * | 3/2017 | | B60W 10/06 |
| CN | 100582459 C * | 1/2010 | | F02D 29/02 |
| CN | 101900043 A * | 12/2010 | | B66F 9/22 |

(Continued)

*Primary Examiner* — Hung Q Nguyen
(74) *Attorney, Agent, or Firm* — K&L Gates LLP

(57) ABSTRACT

An electric drive system for a vehicle and a method includes determining a headroom target for a drive system of a vehicle that includes an engine. The method includes determining whether a current speed of the engine can be decreased while the engine continues to provide a requested traction output of the drive system, and responsive to determining that the current speed of the engine can be decreased, decreasing the current speed of the engine to a reduced speed while the engine maintains the headroom target determined by the drive system.

19 Claims, 3 Drawing Sheets

(56) References Cited

U.S. PATENT DOCUMENTS

2022/0135018 A1\* 5/2022 Sheidler ................. B60K 6/485
56/10.2 A

FOREIGN PATENT DOCUMENTS

| CN | 102128093 | A | \* | 7/2011 | ............ B60W 10/06 |
|----|-----------|---|---|--------|--------------------------|
| CN | 102146848 | A | \* | 8/2011 | ........... F02D 31/001 |
| CN | 103189576 | A | \* | 7/2013 | .............. B60L 1/003 |
| CN | 105917101 | A | \* | 8/2016 | ............ B60W 10/06 |
| CN | 111959485 | A | \* | 11/2020 | ............ B60W 10/06 |
| EP | 0437266 | A2 | \* | 7/1991 | |
| EP | 0732491 | A2 | \* | 9/1996 | |
| EP | 1522450 | A2 | \* | 4/2005 | ............. B60H 1/004 |
| EP | 2636877 | A2 | \* | 9/2013 | ........... F02D 31/007 |
| JP | 2007120425 | A | \* | 5/2007 | ................ B66F 9/22 |
| JP | 2016160662 | A | \* | 9/2016 | ............... B60K 6/24 |
| WO | WO-2009038017 | A1 | \* | 3/2009 | ............ E02F 9/2075 |
| WO | WO-2009082446 | A1 | \* | 7/2009 | ............ F02D 29/04 |
| WO | WO-2009157891 | A1 | \* | 12/2009 | ............ B60W 10/06 |
| WO | WO-2022163410 | A1 | \* | 8/2022 | |

\* cited by examiner

ELECTRIC DRIVE SYSTEM FOR A VEHICLE

CROSS-REFERENCE TO RELATED APPLICATIONS

This application claims priority to U.S. Provisional Application No. 63/228,418 (filed 2 Aug. 2021), the entire disclosure of which is incorporated herein by reference.

BACKGROUND

Technical Field

The subject matter described herein relates to a propulsion system including an electric drive system and related method.

Discussion of Art

Vehicles carrying cargo can require varying power outputs to enable the vehicles to be propelled along routes. The vehicle engines may operate at a variety of speeds to generate different amounts of power. When a different amount of power is needed the system can adjust and accommodate. A headroom target calculation may be useful in operating the vehicle. The headroom target references the difference between a real time power output and available power. Vehicles may operate based on predetermined loading schemes of the vehicles. For example, during operation of the vehicle, a margin of propulsion power may provide support a variety of load transients (e.g., parasitic and/or traction) and accelerations when required. However, the resulting headroom target may change during operation of the vehicles. This may, for example, cause the engine to run at speeds higher than may be required based on the real time power need. In turn, this may cause the vehicle to consume an unnecessary amount of fuel and may increase wear on the engine system. It may be desirable to have a system and method that differs from those that are currently available.

BRIEF DESCRIPTION

In one or more embodiments, a method includes determining a headroom target for a drive system of a vehicle that includes an engine. The method may include determining whether a current speed of the engine can be decreased while the engine continues to provide a requested traction output of the drive system, and responsive to determining that the current speed of the engine can be decreased, decreasing the current speed of the engine to a reduced speed while the engine maintains the headroom target determined by the drive system.

In one or more embodiments, a propulsion system includes a controller having one or more processors configured to determine a headroom target of an engine of a drive system of a vehicle, and determine whether a current speed of the engine can be decreased while the engine continues to provide a requested traction output of the drive system. The one or more processors may decrease the current speed of the engine to a reduced speed while the engine maintains the headroom target responsive to determining that the current speed of the engine can be decreased.

In one or more embodiments, a method includes determining a headroom target of a drive system of a vehicle having an engine by comparing the headroom target with a real time headroom. The real time headroom is a difference between a real time power consumed by the drive system and a power capability of the engine at the current speed of the engine. The method may include determining whether a current speed of the engine can be decreased while the engine continues to provide a requested traction output of the drive system, and responsive to determining that the current speed of the engine can be decreased, decreasing the current speed of the engine to a reduced speed while the engine maintains the headroom target and the requested traction output.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
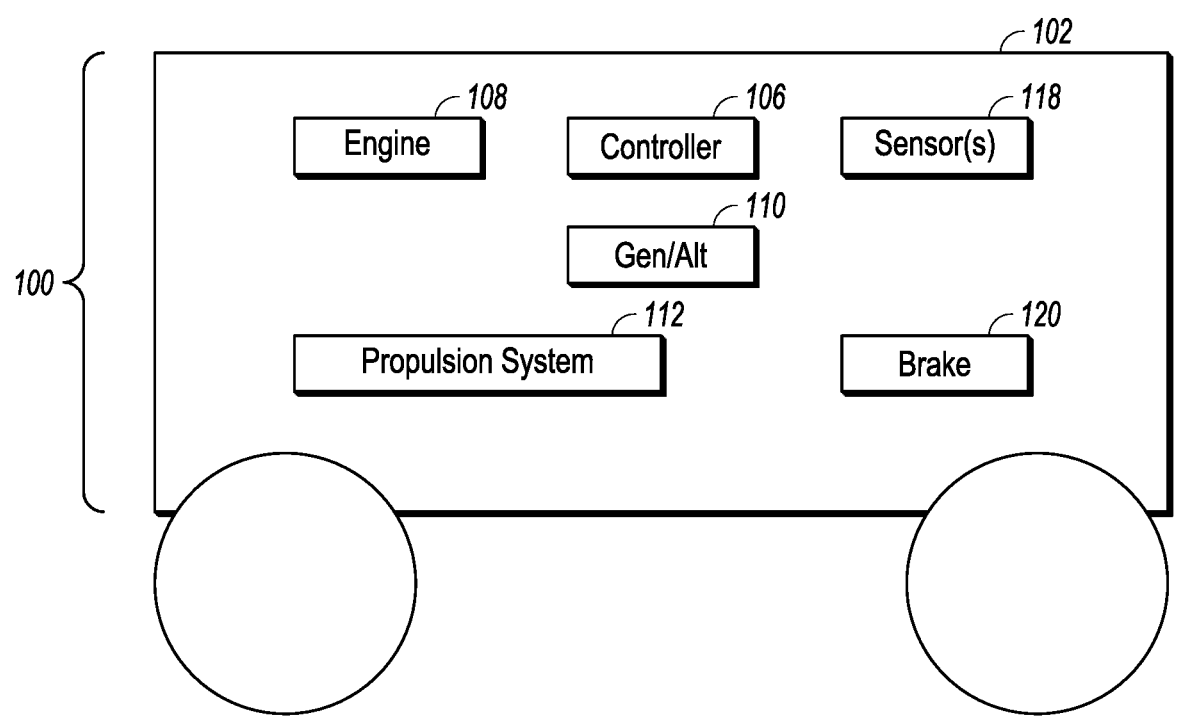
FIG. 1 illustrates one example of an electric drive system.

Embodiments of the subject matter described herein relate to a propulsion system and method of operation. The propulsion system may include an electric drive system. The method may control the vehicle, the electric drive, and aspects of the engine as a result of the needs of the electric drive system. The engine speed may operate based at least in part on a headroom target of the engine. This may increase some efficiencies of the overall system, such as the speed at which the engines operates (e.g., by consuming less fuel).

In one embodiment, an electric drive system of a vehicle can determine a headroom target for a propulsion system or drive system of the vehicle, including an engine. In this embodiment, the headroom target may be a fixed value. In other embodiments, the target may be a dynamically changing value, or may vary between a fixed value and a dynamically changing value during operation of the vehicle depending, in part, on the operating mode of the vehicle. The headroom target of the engine may be determined by comparing the headroom target with a real time headroom for the drive system of the vehicle. For example, the headroom target may be the desired drive system power headroom that should be maintained with the amount of engine speed reduction. The real time headroom may be the difference between the real time power that is consumed by the drive system and a power capability of the engine at the current speed of the engine.

The headroom target or desired margin between real time power and power capability of the engine may be dynamically changed based on a vehicle characteristic, such as, but not limited to, a vehicle operating state (e.g., payload weight and/or type, speed, grade on which the vehicle moves, or the like), ambient conditions (e.g., temperature, elevation, ground conditions, or the like), location of the vehicle, vehicle system health, or the like. Optionally, the headroom target may be based on a designated transient response of the vehicle, such as, but not limited to, a parasitic load transient, a traction load transient, a designated acceleration-on-demand response, or the like. If the current speed of the engine may be decreased while the engine continues to provide a requested target output of the vehicle, then the speed of the engine may be decreased to a reduced speed. The engine may substantially maintain the headroom target, such as within a predetermined threshold value or range, while the engine operates at the reduced speed.

During operation, the drive system may monitor one or more operating characteristics of the vehicle and may determine a headroom target to provide desired system performance. The drive system may adjust engine speeds one or more times during operation of the vehicle based on the determined headroom target. In one embodiment, another factor for the adjustment or determination may be the operating mode of the vehicle. Contemplated operating modes may include forward or reverse movement, idle, hill climb, hill descent, dumping, or the like. For example, the headroom target may be determined based on a determined, or a predetermined, interval cycle. Optionally, the desired headroom target may be continuously evaluated based on the interval cycle. Such cycles may be as frequent as every 5 minutes, or as long as every hour. Other metrics besides time may be used, such as every 20 miles, every 5° change in ambient temperature, every 10° change in elevation of the vehicle, or any combination of two or more thereof. In one or more embodiments, the headroom target may be determined automatically by a control system onboard and/or off-board the vehicle system. Optionally, the process of determining the headroom target may be manually controlled by an operator onboard and/or off-board the vehicle system (e.g., via remote control of the vehicle system). For example, an operator may control the vehicle system to determine the headroom target at a time outside of the predetermined interval cycle.

Responsive to determining the headroom target, the speed of the engine may be decreased while the engine continues to provide at least the requested traction output of the vehicle. For example, determination of the headroom target may indicate that the speed of the engine may be reduced while the engine may continue to provide a necessary amount of traction output. Operating the engine at the reduced speed can help achieve reduced fuel consumption without sacrificing power output of the vehicle.

The drive system also can determine whether the current speed of the engine cannot be decreased. For example, the drive system may determine that if the speed of the engine decreases, that the traction output of the vehicle may be reduced, diminish, or the like. Responsive to determining that the current speed of the engine cannot be decreased, the drive system may substantially maintain the current speed of the engine, or may increase the speed of the engine in order for the engine to provide a requested traction output of the vehicle (e.g., within a predetermined threshold range of value of traction output, or the like).

In one embodiment, the drive system may have a local data collection system deployed that may use machine learning to enable derivation-based learning outcomes. The drive system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

The drive system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The drive system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The drive system can use this artificial intelligence or machine learning to receive input (e.g., operating characteristics of the vehicle), use a model that associates different operating characteristics with different headroom targets to select a new or different headroom target, and then provide an output (e.g., the new or different headroom target). The drive system may receive additional input (e.g., new or different operating characteristics, operator input, or the like), that indicates whether the machine-selected headroom target provided a desirable outcome or not. Based on this additional input, the drive system can change the model, such as by changing which headroom target would be selected when a similar or identical operating characteristics are received the next time or iteration. The drive system can then use the changed or updated model again to select a headroom target, receive feedback on the selected headroom target, change or update the model again, etc., in additional iterations to repeatedly improve or change the model using artificial intelligence or machine learning.

FIG. 1 illustrates one example of an electric drive system 100. The drive system is shown onboard a powered system 102, such as a mining vehicle or a heavy haul vehicle. The drive system may include a controller 106 that represents hardware circuitry having and/or connected with one or more processors, such as one or more microprocessors, field programmable gate arrays, integrated circuits, and/or the like. In one embodiment, the controller can represent an engine control unit. The controller communicates with an engine 108 of the powered system. This engine can be a fuel-consuming engine, such as a diesel engine. Not all embodiments of the inventive subject matter, however, are limited to diesel engines. The engine can represent another type of engine that consumes fuel other than diesel fuel.

The engine consumes fuel to perform work, such as rotating a shaft joined to a generator or alternator 110 ("Gen/Alt" in FIG. 1), which causes the generator or alternator to output electric current. This current can be stored or provided to one or more powered components of the powered system, such as a propulsion system 112 and/or an auxiliary system (not shown). The propulsion system can represent one or more motors that propel the powered system (e.g., traction motors) using electric current output by the generator or alternator. The auxiliary system can represent one or more other loads that consume at least some of this current, but not for propulsion of the powered system. For example, the auxiliary system can represent fans (e.g., blowers that cool parts of the propulsion system, blowers that cool braking resistors, pumps that force coolant to cool the engine or other components, etc.), heating and/or cooling systems that heat or cool an operator cab of the powered system, or the like. Optionally, the propulsion system can represent a first group of one or more components that are powered by at least some of the current output by the generator or alternator and the auxiliary system can represent a separate, different second group of one or more components that also are powered by at least some of the current output by the generator or alternator.

One or more sensors 118 of the drive system may sense characteristics of operation of the powered system and/or environment, and that output signals (e.g., wireless signals and/or signals that are conducted via one or more conductive pathways such as wires, cables, buses, etc.). As described herein, the controller can receive these characteristics to monitor the operation and/or environment of the powered system. Using this information, the controller can change one or more operations of the powered system, such as, but not limited to, an operating speed of the engine, a brake setting, or the like. The number of each of the components shown in FIG. 1 is used as one example. For example, multiples of the engine, the controller, the sensor(s), the generator, the alternator, and/or the propulsion system may be provided.

Figure 2:
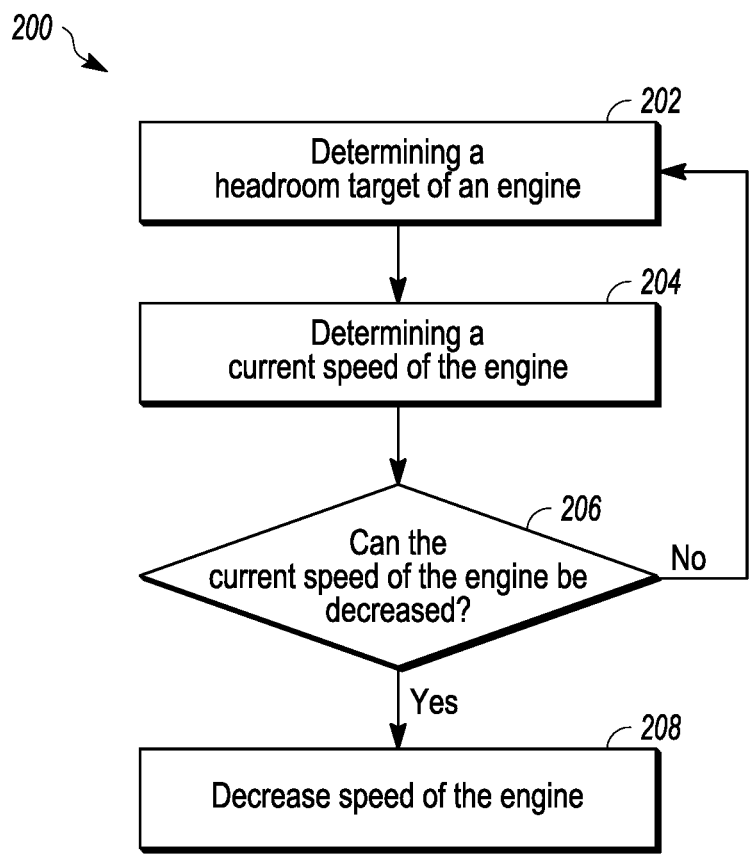
FIG. 2 illustrates a flowchart of one example of a method for controlling a drive system of a powered system.

With reference to the drive system shown in FIG. 1, FIG. 2 illustrates a flowchart of one example of a method 200 for controlling a drive system of a powered system. The operations described in connection with the method can be performed by the controller unless otherwise described herein.

At step 202, a headroom target for a drive system that includes an engine of the powered system is determined. In one or more embodiments, the headroom target may be determined based on a real time headroom of the drive system. The real time headroom may represent a difference between real time power that is generated and/or consumed by the drive system and a power capability of the engine at the current speed of the engine. For example, the real time headroom may represent how the engine is currently operating and the power capability of the engine at the current speed of the engine, and the headroom target may be the desired drive system power headroom that should be maintained responsive to a reduction of the engine speed. In one or more embodiments, the headroom target may be a fixed value. Alternatively, the headroom target may be a dynamically changing value. Optionally, the headroom target may be fixed for a predetermined amount of time of operation of the vehicle or within a predetermined portion of movement along the route, and the headroom target may dynamically change for another amount of time of operation of the vehicle or within a different portion of movement along the route.

The one or more sensors may output signals indicative of vehicle characteristics, a designated transient response of the vehicle, or the like. For example, the vehicle characteristics may include a weight of the vehicle, an operating state of the vehicle or of one or more systems onboard the powered system (e.g., a payload carried by the vehicle, the current speed of the vehicle, a grade on which the vehicle is moving), an ambient condition of the powered system (e.g., ambient temperature, pressure, or humidity, an elevation of the vehicle, a condition of a surface on which the vehicle is moving), a location of the vehicle (e.g., an inclined segment of the route along which the vehicle moves, a radiused or substantially straight segment of the route, if the vehicle is within a cave or tunnel, or the like), a health state of the vehicle or the one or more systems of the powered system, or the like. The designated transient response of the vehicle may include a parasitic load transient, a traction load transient, a designated acceleration-on-demand response of the powered system, or the like.

At step 204, a current speed of the engine is determined. For example, one or more sensors may be accelerometers, tachometers, cameras, or the like, that output signals indicative of a speed of the engine. The sensors can send a signal to the controller that indicates the current speed of the engine, or an average speed of the engine within a predetermined range of time, distance, or the like (e.g., a range of 10 seconds, 10 minutes, 1 hour, a range of 1 mile of travel, 10 miles of travel, or the like).

At step 206, a determination is made to whether the speed of the engine can be decreased while the engine continues to provide a requested traction output of the vehicle. The controller can receive the signals sent by the sensors and determine the current speed of the engine, and determine whether the current speed can be decreased while the engine provides the traction output and while the engine maintains the headroom target.

Figure 3:
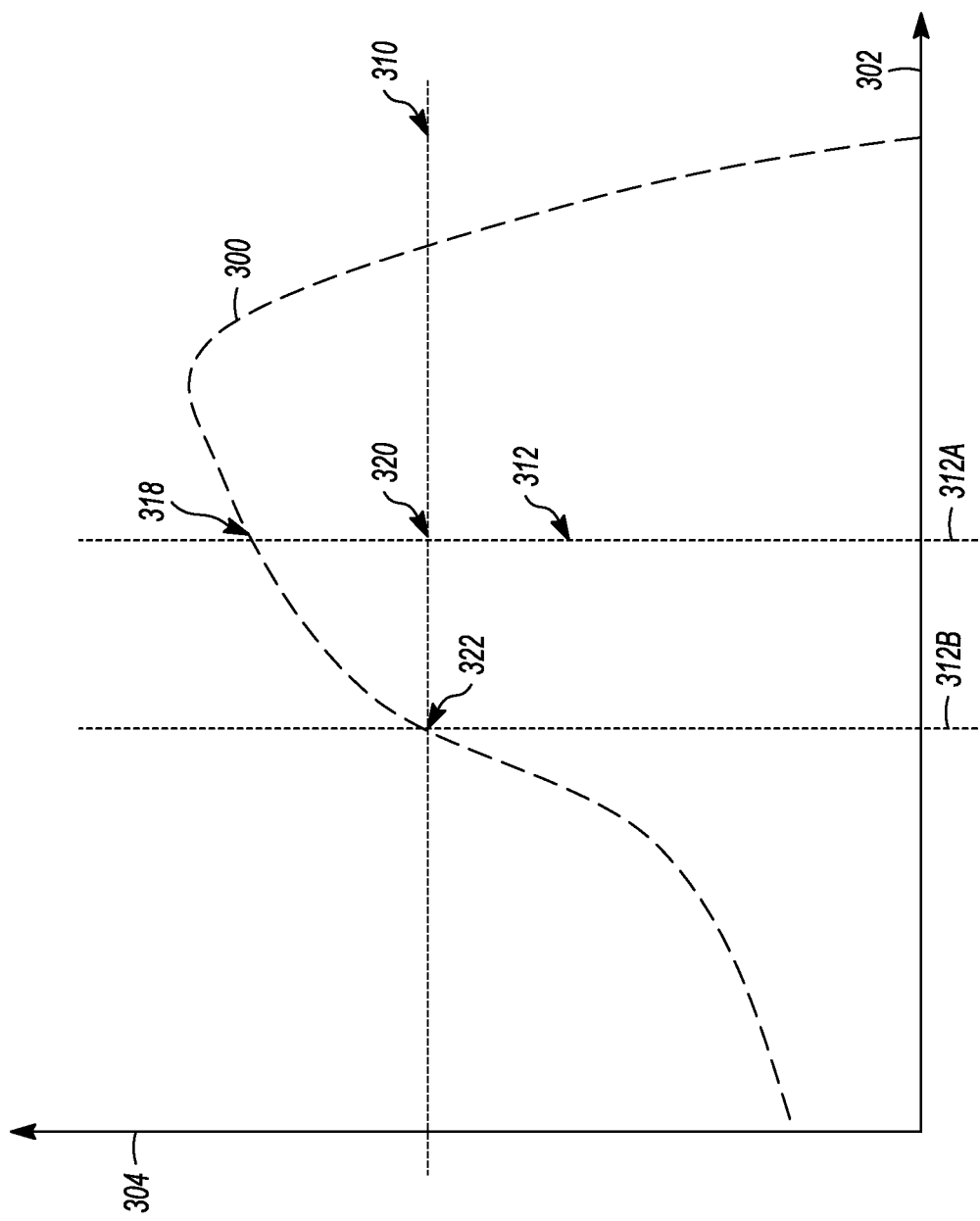
FIG. 3 illustrates one example of a power output curve for the engine of the powered system shown in FIG. 1.

FIG. 3 illustrates one example of a power output curve 300 for the engine of the powered system shown in FIG. 1. The power output curve is shown alongside a horizontal axis 302 representative of different speeds of the engine and a vertical axis 304 representative of different powers output by the engine (at the corresponding engine speeds). The power output curve may represent a fixed headroom target of the drive system of the vehicle.

The controller can refer to the power output curve to determine whether the speed of the engine can be reduced while the traction output of the vehicle is maintained and while engine maintains the headroom target. For example, a power output 310 may indicate the requested traction output of the vehicle. The engine may be operating at different speeds 312 (e.g., 312A, 312B) while providing the requested power output 310 of the vehicle. The controller may determine a power capability of the engine, indicated by a point 318, and determine a real time power consumed by the drive system, indicated by a point 320, as the vehicle operates at a first speed 312A. The controller may determine that the speed of the engine can be decreased from the first speed 312A to a second speed 312B, while the engine continues to provide the requested traction power output and the headroom target of the drive system is maintained. Decreasing the current speed of the engine results in a fuel efficiency of the vehicle improving while the engine maintains the power output and the headroom target.

In one or more embodiments, the headroom target may be a fixed target to operate the engine at the most efficient operating point on the engine while the engine continues to provide the required power output. The fixed headroom target may be based on parasitic load transients, traction load transients, a weight of the vehicle, an acceleration-on-demand response, or the like. Additionally or alternatively, the headroom target may be a dynamically changing value that may change based on the vehicle operating states (e.g., payload, speed, grade), ambient conditions (e.g., temperature, elevation, ground conditions), location of the vehicle, vehicle system health, or the like.

Returning to FIG. 2, if the speed of the engine of the vehicle can be decreased while the power output of the vehicle and the headroom target are substantially maintained (e.g., within a tolerance, such as within 1%, 3%, or 5% in different embodiments). then flow of the method proceeds toward 208. At 208, the controller can operate the vehicle to decrease the speed of the engine. Flow of the method can then return toward 202 or terminate.

Alternatively, if the controller determines that the speed of the engine cannot be decreased while maintaining the power output and the headroom target, then flow of the method returns to 202. Flow of the method 200 may continue while the powered system is in operation, or for a predetermined amount of time of operation of the powered system. In one or more embodiments, the controller can determine that the speed of the engine needs to increase in order for the engine to provide the requested traction output of the vehicle. The controller can control operation of the powered system to increase the speed of the engine.

In one or more embodiments of the subject matter described herein, a method includes determining a headroom target for a drive system of a vehicle that includes an engine. The method may include determining whether a current speed of the engine can be decreased while the engine continues to provide a requested traction output of the drive system, and responsive to determining that the current speed of the engine can be decreased, decreasing the current speed of the engine to a reduced speed while the engine maintains the headroom target determined by the drive system.

The headroom target may be compared with a real time headroom. The real time headroom may be a difference between a real time power consumed by the drive system and a power capability of the engine at the current speed of the engine. The headroom target may be a fixed value. The headroom target may be determined based on one or more of a vehicle characteristic of a designated transient response of the vehicle.

The vehicle characteristic may be a weight of the vehicle. The designated transient response of the vehicle may include one or more of a parasitic load transient, a traction load transient, or a designated acceleration-on-demand response. The headroom target may be a dynamically changing value. Optionally, the headroom target may be determined based on one or more of an operating state of the vehicle, an ambient condition, a location of the vehicle, or a health state of the vehicle.

The operating state of the vehicle may include one or more of a payload carried by the vehicle, the current speed of the vehicle, or a grade on which the vehicle is moving. The ambient condition may be one or more of an ambient temperature, an elevation of the vehicle, or a condition of a surface on which the vehicle is moving. Decreasing the current speed of the engine may result in a fuel efficiency of the vehicle improving while the engine maintains the headroom target.

In one or more embodiments of the subject matter described herein, a propulsion system may include a controller having one or more processors configured to determine a headroom target of an engine of a drive system of a vehicle, and determine whether a current speed of the engine can be decreased while the engine continues to provide a requested traction output of the drive system. The one or more processors decrease the current speed of the engine to a reduced speed while the engine maintains the headroom target responsive to determining that the current speed of the engine can be decreased.

The one or more processors may compare the headroom target with a real time headroom to determine the headroom target. The real time headroom may be a difference between a real time power consumed by the drive system and a power capability of the engine at the current speed of the engine. The headroom target may be determined based on one or more of a vehicle characteristic, a designated transient response of the vehicle, an operating state of the vehicle, an ambient condition, a location of the vehicle, or a health state of the vehicle. The one or more processors may increase a fuel efficiency of the vehicle by decreasing the current speed of the engine while the engine maintains the headroom target.

In one or more embodiments of the subject matter described herein, a method may include determining a headroom target of a drive system of a vehicle having an engine by comparing the headroom target with a real time headroom. The real time headroom is a difference between a real time power consumed by the drive system and a power capability of the engine at the current speed of the engine. The method includes determining whether a current speed of the engine can be decreased while the engine continues to provide a requested traction output of the drive system, and responsive to determining that the current speed of the engine can be decreased, decreasing the current speed of the engine to a reduced speed while the engine maintains the headroom target and the requested traction output.

The headroom target may be a fixed value that is based on one or more of a vehicle characteristic or a designated transient response of the vehicle. The headroom target may be a dynamically changing value that is based on one or more of an operating state of the vehicle, an ambient condition, a location of the vehicle, or a health state of the vehicle. Decreasing the current speed of the engine may result in a fuel efficiency of the vehicle improving while the engine maintains the headroom target. The requested traction output may be based on a weight of the vehicle, a payload carried by the vehicle, and a throttle setting of the vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   determining a headroom target for a drive system of a vehicle, the drive system including an engine;
   determining whether a current speed of the engine can be decreased while the engine continues to provide a requested traction output of the drive system; and
   responsive to determining that the current speed of the engine can be decreased, decreasing the current speed of the engine to a reduced speed while the engine maintains the headroom target determined by the drive system;
   wherein the headroom target is a dynamically changing value.

2. The method of claim 1, further comprising comparing the headroom target with a real time headroom, the real time headroom being a difference between a real time power consumed by the drive system and a power capability of the engine at the current speed of the engine.

3. The method of claim 1, wherein the headroom target is determined based on one or more of an operating state of the vehicle, an ambient condition, a location of the vehicle, or a health state of the vehicle.

4. The method of claim 3, wherein the operating state of the vehicle includes one or more of a payload carried by the vehicle, the current speed of the vehicle, or a grade on which the vehicle is moving.

5. The method of claim 3, wherein the ambient condition is one or more of an ambient temperature, an elevation of the vehicle, or a condition of a surface on which the vehicle is moving.

6. The method of claim 1, wherein decreasing the current speed of the engine results in a fuel efficiency of the vehicle improving while the engine maintains the headroom target.

7. The method of claim 1, wherein the headroom target is the dynamically changing value for a portion of a route of the vehicle and a fixed value for an additional portion of the route of the vehicle.

8. The method of claim 7, wherein the portion of the route is a predetermined amount of time of operation of the vehicle along the route or a predetermined length of the route of the vehicle, and wherein the additional portion of the route is an additional predetermined amount of time of operation of the vehicle along the route or an additional predetermined length of the route of the vehicle.

9. The method of claim 7, wherein the fixed value is determined based on one or more of a vehicle characteristic or a designated transient response of the vehicle.

10. The method of claim 9, wherein the vehicle characteristic is a weight of the vehicle.

11. The method of claim 9, wherein the designated transient response of the vehicle includes one or more of a parasitic load transient, a traction load transient, or a designated acceleration-on-demand response.

12. A propulsion system comprising:
    a controller having one or more processors configured to determine a headroom target of an engine of a drive system of a vehicle and to determine whether a current speed of the engine can be decreased while the engine continues to provide a requested traction output of the drive system, and the one or more processors further configured to decrease the current speed of the engine to a reduced speed while the engine maintains the headroom target responsive to determining that the current speed of the engine can be decreased;

wherein the headroom target is a dynamically changing value.

13. The system of claim 12, wherein the one or more processors are configured to compare the headroom target with a real time headroom, the real time headroom being a difference between a real time power consumed by the drive system and a power capability of the engine at the current speed of the engine.

14. The system of claim 12, wherein the headroom target is determined based on one or more of a vehicle characteristic, a designated transient response of the vehicle, an operating state of the vehicle, an ambient condition, a location of the vehicle, or a health state of the vehicle.

15. The system of claim 12, wherein the one or more processors are configured to increase a fuel efficiency of the vehicle by decreasing the current speed of the engine while the engine maintains the headroom target.

16. A method comprising:
determining a headroom target of a drive system of a vehicle having an engine by comparing the headroom target with a real time headroom, the real time headroom being a difference between a real time power consumed by the drive system and a power capability of the engine at a current speed of the engine;

determining whether the current speed of the engine can be decreased while the engine continues to provide a requested traction output of the drive system; and responsive to determining that the current speed of the engine can be decreased, decreasing the current speed of the engine to a reduced speed while the engine maintains the headroom target and the requested traction output;

wherein the headroom target is a dynamically changing value.

17. The method of claim 16, wherein the headroom target is based on one or more of an operating state of the vehicle, an ambient condition, a location of the vehicle, or a health state of the vehicle.

18. The method of claim 16, wherein decreasing the current speed of the engine results in a fuel efficiency of the vehicle improving while the engine maintains the headroom target.

19. The method of claim 16, wherein the requested traction output is based on a weight of the vehicle, a payload carried by the vehicle, and a throttle setting of the vehicle.

* * * * *